US010683415B2

(12) United States Patent
El-Hibri et al.

(10) Patent No.: US 10,683,415 B2
(45) Date of Patent: Jun. 16, 2020

(54) PAEK/PPSU/PES COMPOSITIONS

(71) Applicant: SOLVAY SPECIALTY POLYMERS USA, LLC, Alpharetta, GA (US)

(72) Inventors: Mohammad Jamal El-Hibri, Atlanta, GA (US); Keshav Gautam, Duluth, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 15/538,321

(22) PCT Filed: Dec. 17, 2015

(86) PCT No.: PCT/EP2015/080332
§ 371 (c)(1),
(2) Date: Jun. 21, 2017

(87) PCT Pub. No.: WO2016/102330
PCT Pub. Date: Jun. 30, 2016

(65) Prior Publication Data
US 2018/0002524 A1 Jan. 4, 2018

Related U.S. Application Data

(60) Provisional application No. 62/095,532, filed on Dec. 22, 2014.

(51) Int. Cl.
| | | |
|---|---|---|
| *C08L 71/12* | (2006.01) | |
| *C08G 75/00* | (2006.01) | |
| *C08L 71/00* | (2006.01) | |
| *C08L 81/00* | (2006.01) | |
| *C08G 65/00* | (2006.01) | |
| *C08K 7/14* | (2006.01) | |
| *C08L 81/06* | (2006.01) | |
| *C08K 3/40* | (2006.01) | |
| *C08L 71/08* | (2006.01) | |
| *C08G 65/40* | (2006.01) | |

(52) U.S. Cl.
CPC .............. *C08L 71/12* (2013.01); *C08G 65/00* (2013.01); *C08G 75/00* (2013.01); *C08K 3/40* (2013.01); *C08K 7/14* (2013.01); *C08L 71/00* (2013.01); *C08L 71/08* (2013.01); *C08L 81/00* (2013.01); *C08L 81/06* (2013.01); *C08G 65/4012* (2013.01); *C08G 2650/40* (2013.01); *C08L 2205/03* (2013.01)

(58) Field of Classification Search
CPC ............................ C08L 71/12; C08L 2205/03
See application file for complete search history.

(56) References Cited

U.S. PATENT DOCUMENTS 4,698,083 A   10/1987   Shioura et al.

FOREIGN PATENT DOCUMENTS

| WO | 2008116939 A1 | 10/2008 | |
|---|---|---|---|
| WO | 2013092492 A1 | 6/2013 | |
| WO | 2013092628 A1 | 6/2013 | |
| WO | WO 2013/092492 A1 * | 6/2013 | ............... B05D 5/12 |
| WO | 2014072447 A1 | 5/2014 | |

OTHER PUBLICATIONS

Murphy J., in "Additives for Plastics Handbook", 2nd Edition, 2001, Chapter 5.2.3., p. 43-48—Elsevier Advanced Technology.
Hausrath R.L. et al., in "Fiberglass and Glass Technology", 2010, XIV, Chapter 5, p. 197-225—Wallenberger F.T. and Bingham PA. (Editors).
Standard ASTM D1238-04, "Standard Test Method for Melt Flow Rates of Thermoplastics by Extrusion Plastometer", 2004, p. 1-13.
Standard ASTM C1557-03, "Standard Test Method for Tensile Strength and Young's Modulus of Fibers", 2003, p. 1-10.
Standard ASTM D638-10, "Standard Test Method for Tensile Properties of Plastics", 2010, p. 1-16.
Standard ASTM D256, Historical 2005 Revision A, "Standard Test Methods for Determining the Izod Pendulum Impact Resistance of Plastics", p. 1-20.
Standard ASTM D4812-06, "Standard Test Method for Unnotched Cantilever Beam Impact Resistance of Plastics", 2006, p. 1-12.
Mohit Sharma & Jayashree BIJWE "Influence of molecular weight on performance properties of polyethersulphone and its composites with carbon fabric," Wear, vols. 274-275,2012, pp. 388-394.

\* cited by examiner

*Primary Examiner* — Robert D Harlan

(57) ABSTRACT

A composition [composition (C)] comprising from 1 to 90% by weight (wt. %) of at least one poly(aryl ether ketone) [(PAEK) polymer], from 1 to 25 wt. % of at least one polyphenylsulfone polymer [(PPSU) polymer], from 1 to 90 wt. % of at least one polyethersulfone polymer [(PES) polymer], and from 0.1 to 50 wt. % of at least one reinforcing filler, where all wt. % are based on the total weight of the composition (C) and the (PES) polymer has as melt flow rate (MFR) at a temperature of 380° C. and under a load of 2.16 kg according to ASTM D1238 of greater than 35 g/10 min.

16 Claims, No Drawings

PAEK/PPSU/PES COMPOSITIONS

CROSS-REFERENCE TO RELATED APPLICATIONS

This application claims priority to U.S. Provisional Application No. 62/095,532, filed Dec. 22, 2014, which is incorporated by reference herein in its entirety.

FIELD OF THE INVENTION

The present invention relates to high performance polyarylether polymer compositions and articles made there from. In particular, the present invention relates to a composition comprising at least one poly(aryletherketone) (PAEK), at least one polyphenylsulfone (PPSU), at least one polyethersulfone (PES) polymer, and at least one reinforcing filler.

BACKGROUND

There remains a need to develop low melt viscosity poly(aryletherketone) (PAEK) compositions with improved mechanical properties such as strength and toughness.

SUMMARY OF THE INVENTION

The Applicant has now found surprisingly that it is possible to provide PAEK/PPSU/PAES compositions fulfilling the above-mentioned need.

Exemplary embodiments include a composition [composition (C)] including:

from 1 to 90% by weight (wt. %) of at least one poly(aryl ether ketone) [(PAEK) polymer], wherein more than 50% by moles of the recurring units of said (PAEK) polymer are recurring units ($R_{PAEK}$) comprising a Ar—C(O)—Ar' group, where:

Ar and Ar', equal to or different from each other, are aromatic groups, and the recurring units ($R_{PAEK}$) are selected from groups of formulae (J-A) to (J-O):

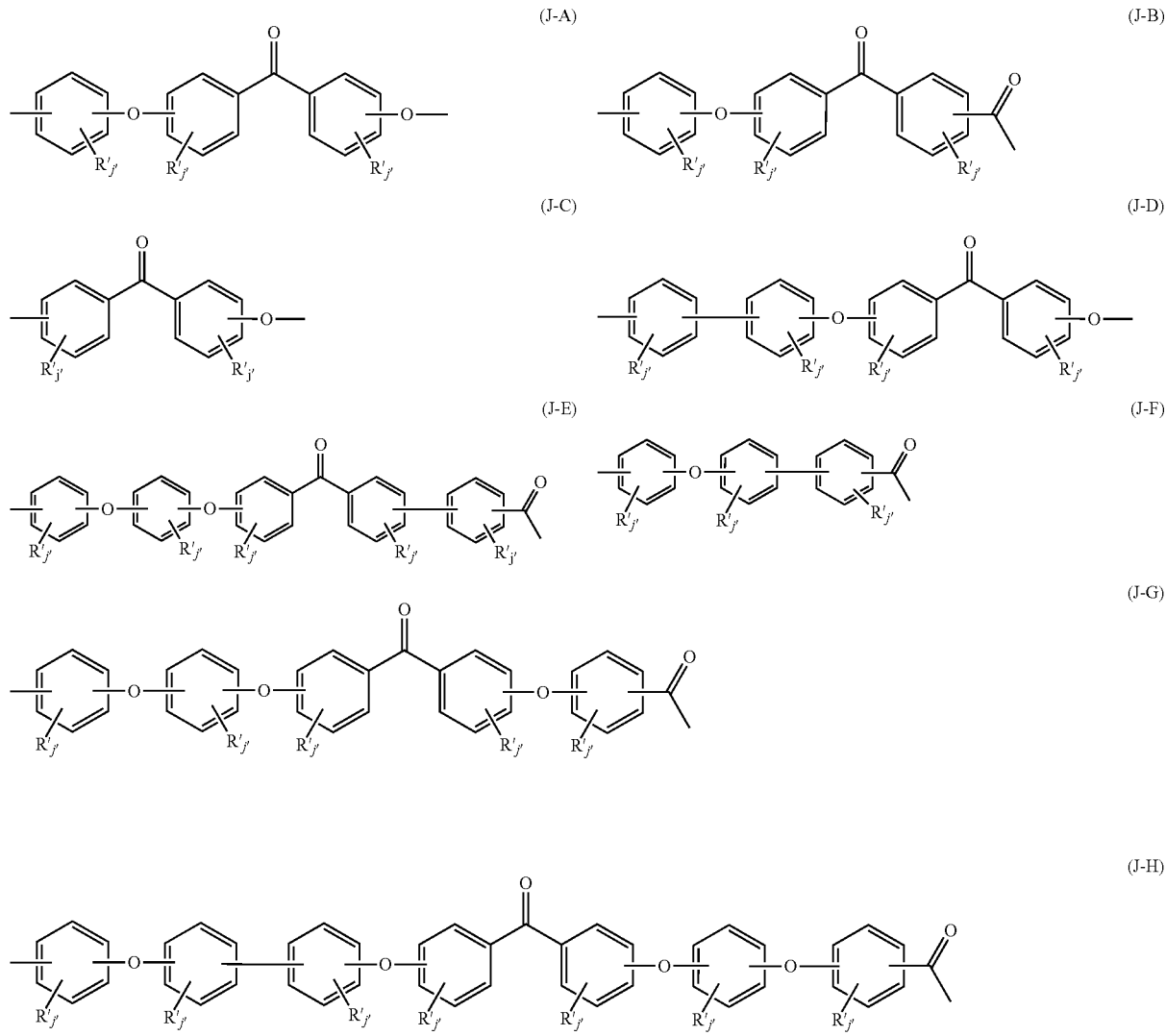

-continued

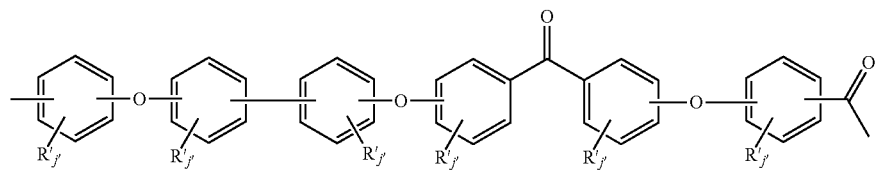
(J-I)

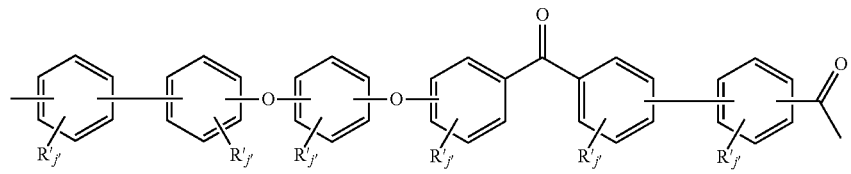
(J-J)

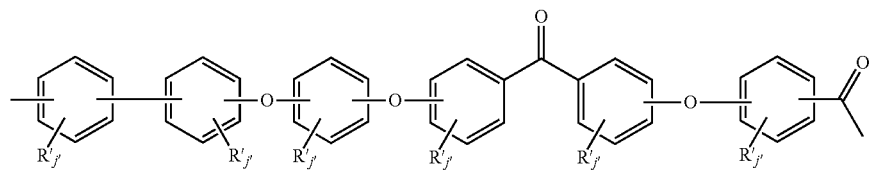
(J-K)

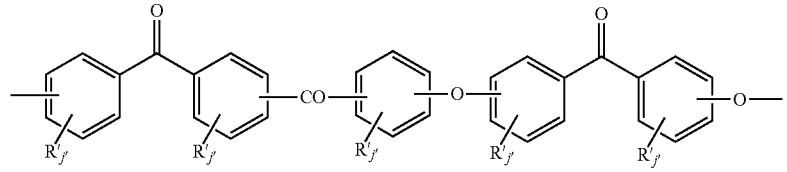
(J-L)

(J-M) (J-N)
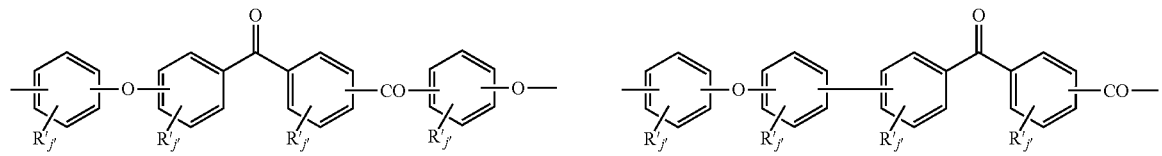

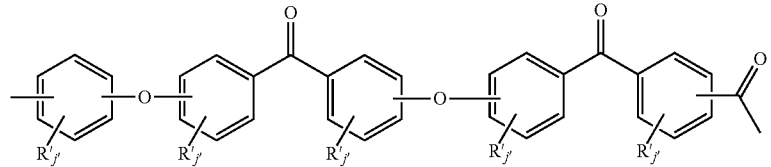
(J-O)

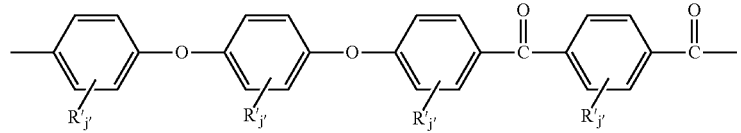
(J-P)

where:
 each of R', equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and
 j is zero or an integer ranging from 1 to 4;

from 1 to 25 wt. % of at least one polyphenylsulfone polymer [(PPSU) polymer], wherein more than 50% by moles of the recurring units of said (PPSU) polymer are recurring units ($R_{PPSU}$) of formula (A):

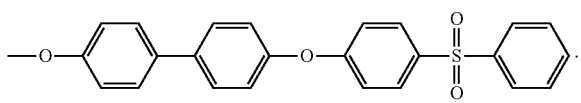
(A)

from 1 to 90 wt. % of at least one polyethersulfone polymer [(PES) polymer], wherein more than 50% moles of recurring units of the (PES) polymer are recurring units ($R_{PES}$) independently selected from units of formula (C):

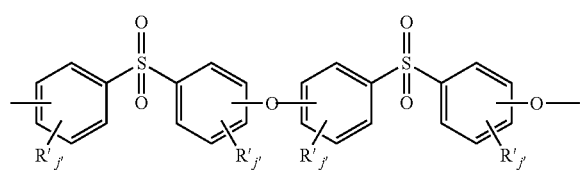

(C)

where:
each of R', equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
each of j', equal to or different from each other, is selected from 0, 1, 2, 3, or 4; and from 0.1 to 50 wt. % of at least one reinforcing filler,
where:
all wt. % are based on the total weight of the composition (C), and the PES polymer has a melt flow rate (MFR) at a temperature of 380° C. and under a load of 2.16 kg according to ASTM D1238 of greater than 35 g/10 min.

Preferably, more than 50% moles of recurring units of the (PAEK) polymer are recurring units ($R_{PAEK}$) selected from formulae (J'-A) to (J'-O) herein below:

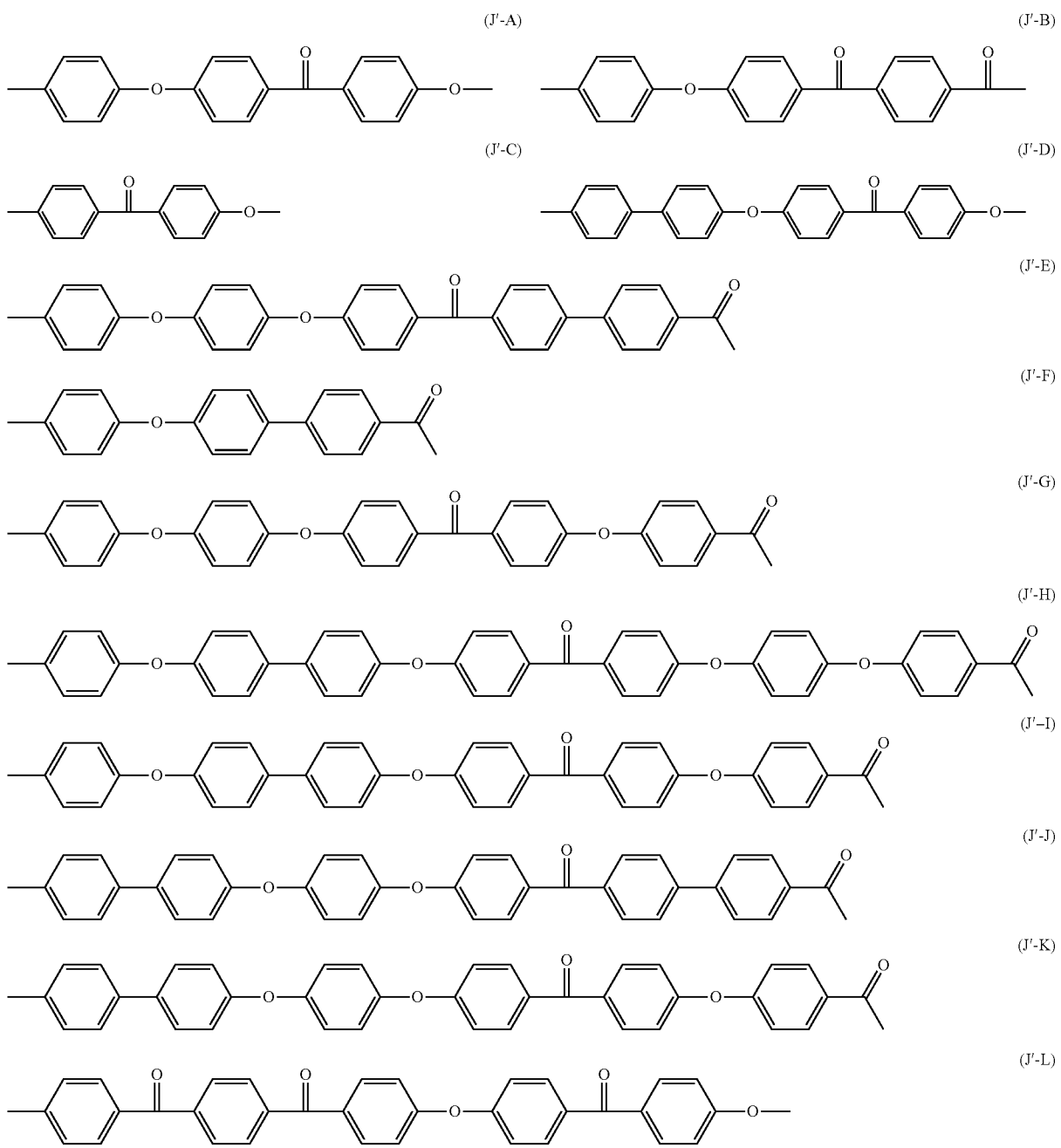

-continued

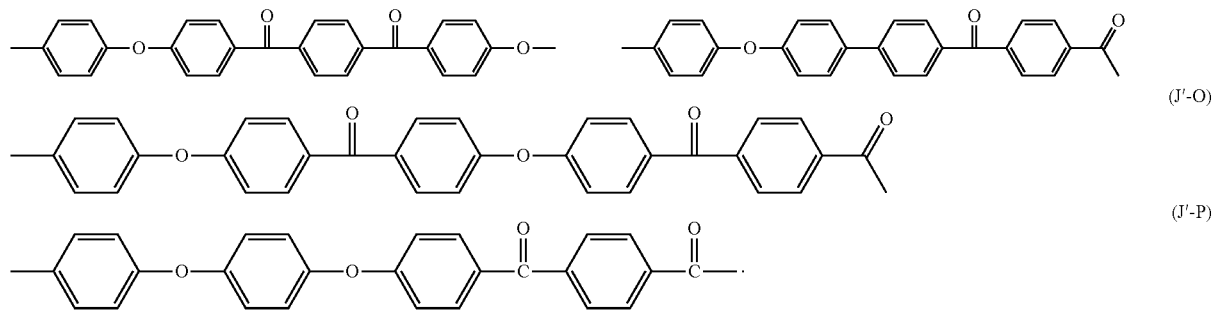

The (PAEK) polymer is preferably present in an amount ranging from 35 to 75 wt. %, based on the total weight of the composition (C). Preferably, the (PAEK) polymer is polyetheretherketone (PEEK).

The (PPSU) polymer is preferably present in an amount ranging from 4 to 10 wt. %, based on the total weight of the polymer composition (C).

Preferably, more than 50% moles of the recurring units ($R_{PES}$) are recurring units of formula (D):

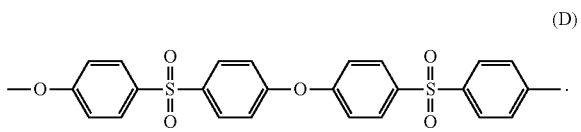

The PES polymer may be present in an amount ranging from 25 to 70 wt. %, based on the total weight of the composition (C), preferably in an amount ranging from 25 to 60 wt. % based on the total weight of the composition (C).

The reinforcing filler may be a glass fiber filler and may be present in an amount less than or equal to 40 wt. %, based on the total weight of the polymer composition (C). Preferably, the glass fiber is an S-glass fiber.

In exemplary embodiments, the PES polymer has a melt flow rate (MFR) at a temperature of 380° C. and under a load of 2.16 kg according to ASTM D1238 of greater than or equal to 55 g/10 min. Preferably, the PES polymer has a melt flow rate (MFR) at a temperature of 380° C. and under a load of 2.16 kg according to ASTM D1238 ranging from about 65 g/10 min to about 85 g/10 min.

According to exemplary embodiments, the composition may exhibit at least one of a tensile breaking strength measured according to ASTM D638 of greater than or equal to about 30,000 psi, a tensile elongation at break measured according to ASTM D638 of greater than or equal to about 2.6%, a notched Izod impact resistance measured according to ASTM D256 of greater than or equal to about 1.9 ft-lb/in, and a no notch Izod impact resistance measured according to ASTM D4812 of greater than or equal to about 21 ft-lb/in.

Exemplary embodiments include a process for manufacturing the polymer composition (C) including mixing the at least one (PAEK) polymer, the at least one (PPSU) polymer, the at least one PES polymer, the at least one reinforcing filler, and optionally at least one other ingredient (I).

Exemplary embodiments also include an article including the polymer composition (C) as described herein.

DETAILED DESCRIPTION OF PREFERRED EMBODIMENTS

Exemplary embodiments include a composition [composition (C)] comprising:
from 1 to 90% by weight (wt. %) of at least one poly(aryl ether ketone) [(PAEK) polymer], wherein more than 50% by moles of the recurring units of said (PAEK) polymer are recurring units ($R_{PAEK}$) comprising a Ar—C(O)—Ar' group, with Ar and Ar', equal to or different from each other, being aromatic groups. The recurring units ($R_{PAEK}$) may be selected from formulae (J-A) to (J-O):

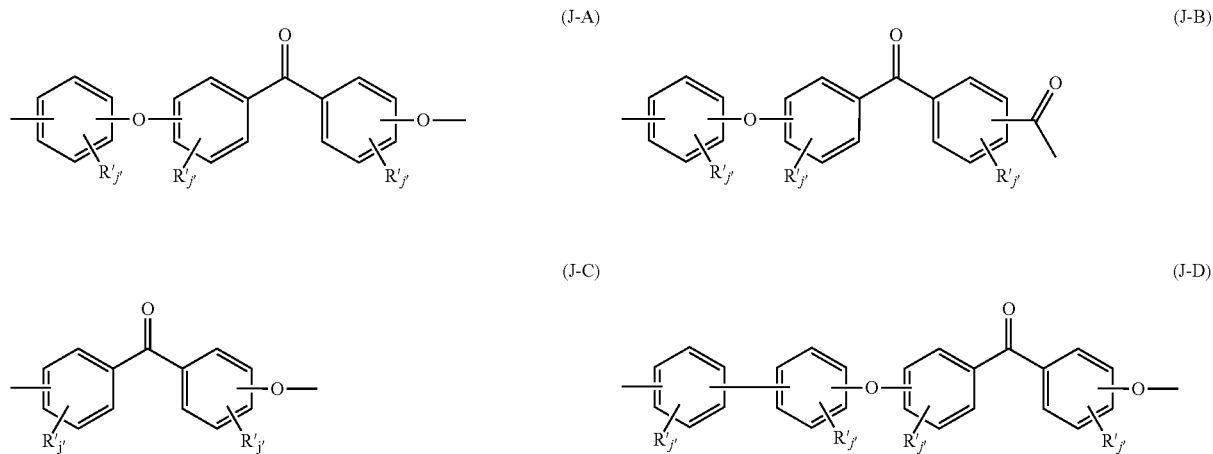

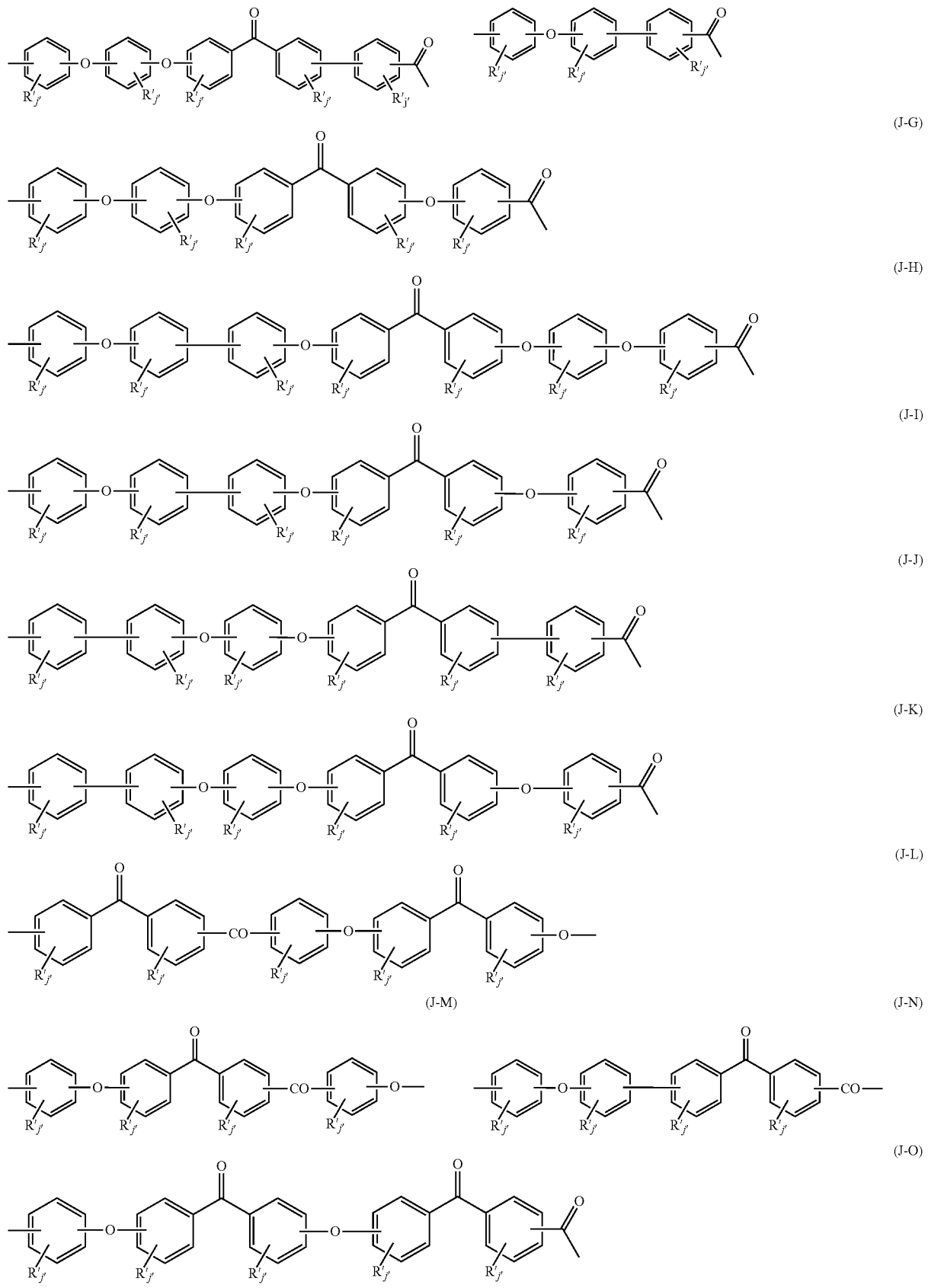

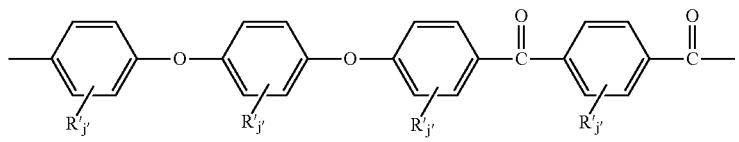
(J-P)

wherein:
each of R', equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and j is zero or an integer from 1 to 4;

from 1 to 25 wt. % of at least one polyphenylsulfone polymer [(PPSU) polymer], wherein more than 50% by moles of the recurring units of said (PPSU) polymer are recurring units ($R_{PPSU}$) of formula (A):

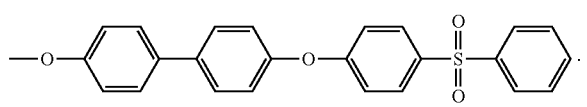
(A)

from 1 to 90 wt. % of at least one polyethersulfone and at least one polyethersulfone polymer [(PES) polymer]; wherein more than 50% moles of the recurring units of said (PES) polymer are recurring units ($R_{PES}$), said recurring units ($R_{PES}$), equal to or different from each other at each occurrence, complying with formula (C):

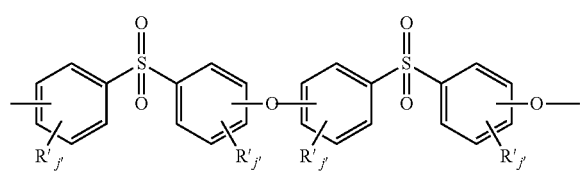
(C)

wherein:
each of R', equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; each of j', equal to or different from each other and at each occurrence, is independently zero or is an integer from 1 to 4; and from 0.1 to 50 wt. % of at least one reinforcing filler, and wherein:
all wt. % are based on the total weight of the composition (C), and the PES polymer has a melt flow rate (MFR) at a temperature of 380° C. and under a load of 2.16 kg according to ASTM D1238 of greater than 35 g/10 min.

As it will be explained in more detail in the specification, with reference to the working experiments, the Applicant has surprisingly found that the addition of (PPSU) polymer to mixtures of (PAEK) polymer and (PES) polymer, as detailed above, is particularly effective in improving mechanical properties and more precisely, in enhancing toughness. Without being bound by the theory it is believed that the (PPSU) polymer acts as a compatibilizer between (PAEK) and the (PES) polymer, thus providing unexpected properties enhancement.

In the rest of the text, the expression "(PAEK) polymer" is understood, for the purposes of the present invention, both in the plural and the singular, that is to say that the inventive composition may comprise one or more than one (PAEK) polymer. It is understood that the same applies for the expressions "(PPSU) polymer," "(PES) polymer", and the "reinforcing filler".

Poly(Aryl Ether Ketone) Polymer

As said, more than 50% by moles of the recurring units of the (PAEK) polymer are recurring units ($R_{PAEK}$), as detailed above.

In recurring units ($R_{PAEK}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

In recurring units ($R_{PAEK}$), j' is preferably at each occurrence zero, such that the phenylene moieties have no other substituents than those enabling linkage in the main chain of the polymer.

Preferred recurring units ($R_{PAEK}$) are thus selected from those of formulae (J'-A) to (J'-O):

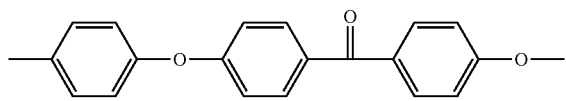
(J'-A) (J'-B)

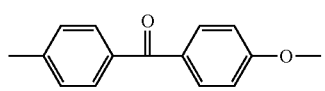
(J'-C)

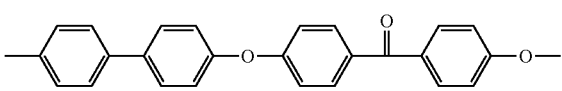
(J'-D)

-continued
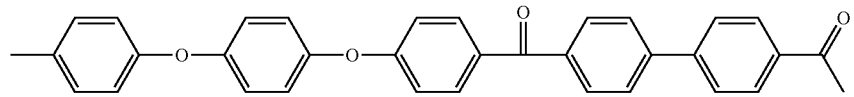 (J'-E)
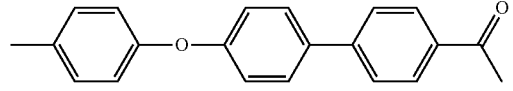 (J'-F)
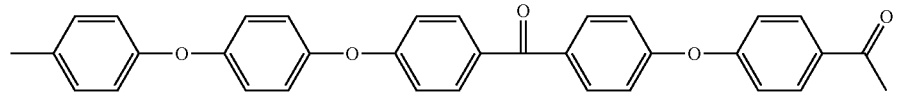 (J'-G)
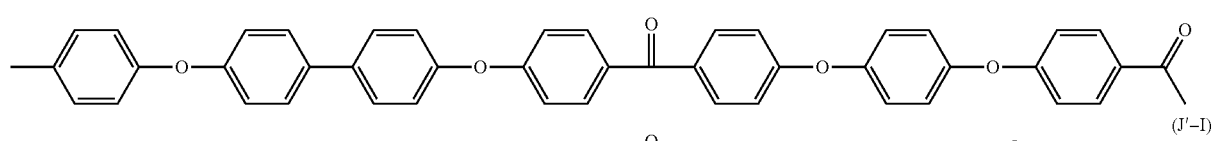 (J'-H)
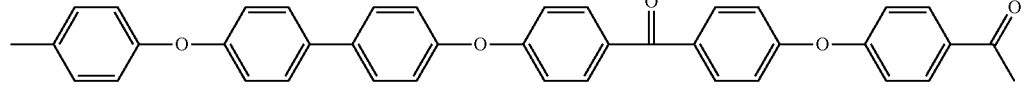 (J'-I)
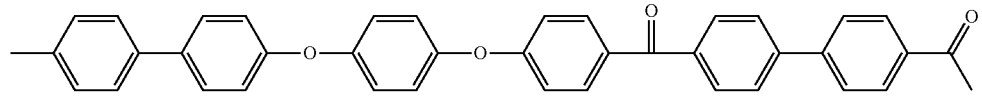 (J'-J)
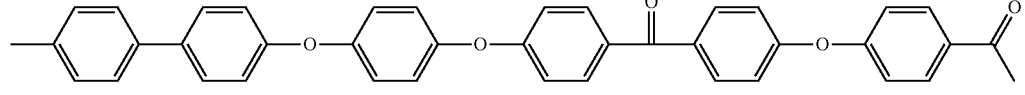 (J'-K)
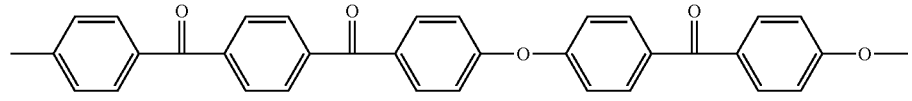 (J'-L)
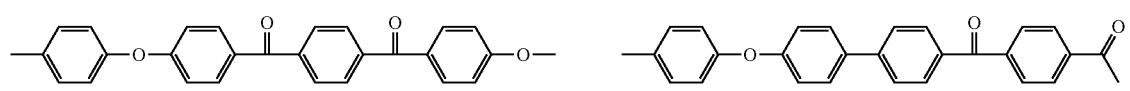 (J'-M)
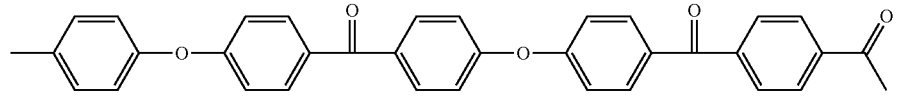 (J'-N)
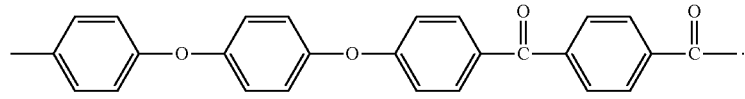 (J'-O)
(J'-P)
Still more preferably, ($R_{PAEK}$) are chosen from:
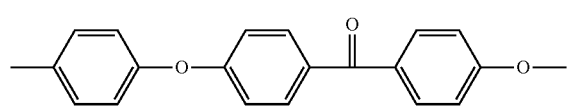 (J'-A)
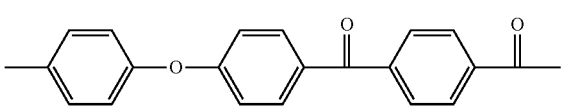 (J'-B)
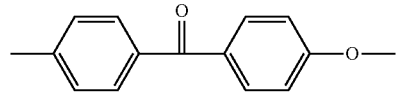 (J'C)

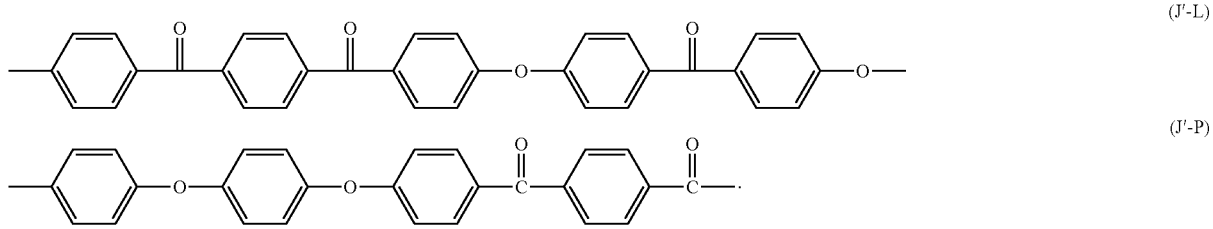

In the (PAEK) polymer, as detailed above, preferably more than 60% by moles, more preferably more than 80% by moles, still more preferably more than 90% by moles of the recurring units are recurring units ($R_{PAEK}$), as above detailed.

Still, it is generally preferred that substantially all recurring units of the (PAEK) polymer are recurring units ($R_{PAEK}$), as detailed above; chain defects, or very minor amounts of other units might be present, it being understood that these latter do not substantially modify the properties of the (PAEK) polymer.

The (PAEK) polymer may be notably a homopolymer, a random, alternating or block copolymer. When the (PAEK) polymer is a copolymer, it may notably include (i) recurring units ($R_{PAEK}$) of at least two different formulae chosen from formulae (J-A) to (J-O), or (ii) recurring units ($R_{PAEK}$) of one or more formulae (J-A) to (J-O) and recurring units ($R^*_{PAEK}$) different from recurring units ($R_{PAEK}$).

As will be detailed later on, the (PAEK) polymer may be a polyetheretherketone polymer [(PEEK) polymer]. Alternatively, the (PAEK) polymer may be a polyetherketoneketone polymer [(PEKK) polymer], a polyetherketone polymer [(PEK) polymer], a polyetheretherketoneketone polymer [(PEEKK) polymer] or a polyetherketoneetherketoneketone polymer [(PEKEKK) polymer].

The (PAEK) polymer may also be a blend including at least two different (PAEK) polymers chosen from (PEKK) polymers, (PEEK) polymers, (PEK) polymers, (PEEKK) polymers and (PEKEKK) polymers, as above detailed.

As used herein, the term "(PEEK) polymer" is intended to denote any polymer of which more than 50% by moles of the recurring units are recurring units ($R_{PAEK}$) of Formula J'-A.

Preferably more than 75% by moles, preferably more than 85% by moles, preferably more than 95% by moles, preferably more than 99% by moles of the recurring units of the (PEEK) polymer are recurring units of formula J'-A. Most preferably all or essentially all of the recurring units of the (PEEK) polymer are recurring units of formula J'-A.

As used herein, the term "(PEKK) polymer" is intended to denote any polymer of which more than 50% by moles of the recurring units are recurring units ($R_{PAEK}$) of formula J'-B.

Preferably more than 75% by moles, preferably more than 85% by moles, preferably more than 95% by moles, preferably more than 99% by moles of the recurring units of the (PEKK) polymer are recurring units of formula J'-B. Most preferably all the recurring units of the (PEKK) polymer are recurring units of formula J'-B.

As used herein, the term "(PEK) polymer" is intended to denote any polymer of which more than 50% by moles of the recurring units are recurring units ($R_{PAEK}$) of formula J'-C.

Preferably more than 75% by moles, preferably more than 85% by moles, preferably more than 95% by moles, preferably more than 99% by moles of the recurring units of the (PEK) polymer are recurring units of formula J'-C. Most preferably all the recurring units of the (PEK) polymer are recurring units of formula J'-C.

As used herein, the term "(PEKEKK) polymer" is intended to denote any polymer of which more than 50% by moles of the recurring units are recurring units ($R_{PAEK}$) of formula J'-L.

Preferably more than 75% by moles, preferably more than 85% by moles, preferably more than 95% by moles, preferably more than 99% by moles of the recurring units of the (PEKEKK) polymer are recurring units of formula J'-L. Most preferably all the recurring units of the (PEKEKK) polymer are recurring units of formula J'-L.

According to exemplary embodiments the (PAEK) polymer is a (PEEK) homopolymer, i.e. a polymer of which substantially all the recurring units of the (PEEK) polymer are recurring units of formula J'-A, wherein chain defects, or very minor amounts of other units might be present, being understood that these latter do not substantially modify the properties of the (PEEK) homopolymer.

The (PAEK) polymer can have an intrinsic viscosity (IV) of at least 0.50 dl/g, preferably at least 0.60 dl/g, more preferably at least 0.70 dl/g, as measured in 95-98% sulfuric acid (d=1.84 g/ml) at a (PAEK) polymer concentration of 0.1 g/100 ml.

The (PAEK) polymer, for example PEEK, may have a melt viscosity as high as 0.25 kPa-s, but preferably lower than 0.20 kPa-s and most preferably less than 0.18 kPa-s at 400° C. and a shear rate of 1000 s$^{-1}$, as measured using a capillary rheometer in accordance with ASTM D3835. The (PAEK) polymer, for example PEEK, may have a melt viscosity as low as 0.05 kPa-s. under the above-described conditions.

The (PAEK) polymer, for example PEEK, may have a melt viscosity at 400° C. and a shear rate of 1000 s$^{-1}$, as measured using a capillary rheometer in accordance with ASTM D3835, ranging from about 0.05 kPa-s to about 0.25 kPa-s, preferably from about 0.06 kPa-s to about 0.20 kPa-s, preferably from about 0.07 kPa-s to about 0.18 kPa-s, preferably from about 0.08 kPa-s to about 0.15 kPa-s.

As a capillary rheometer, a Kayeness Galaxy V Rheometer (Model 8052 DM) may be used.

Non limitative examples of suitable commercially available (PAEK) polymers include KETASPIRE® polyetheretherketone commercially available from Solvay Specialty Polymers USA, LLC.

The (PAEK) polymer can be prepared by any method known in the art for the manufacture of poly(aryl ether ketone)s.

Polyetheretherketone homopolymers are commercially available notably from Solvay Specialty Polymers USA, LLC as KETASPIRE® and GATONE® poly(etheretherketone)s.

The weight percent of the (PAEK) polymer in the composition (C) is preferably at least 10 wt. %, preferably of at least 20 wt. %, more preferably of at least 30 wt. %, more preferably of at least 35 wt. %, more preferably of at least 40 wt. %, based on the total weight of the composition (C). The weight percent of the polymer (PAEK) in the composition (C) is preferably at most 85 wt. %, more preferably of at most 80 wt. %, more preferably at most 75 wt. %, more preferably of at most 70 wt. %, based on the total weight of the composition (C).

In exemplary embodiments, the composition (C) comprises the (PAEK) polymer in an amount ranging from 35 to 75 wt. %, preferably 35 to 65 wt. %, preferably 35 to 55 wt. %, preferably 35 to 45 wt. %, preferably 35 to 40 wt. %, preferably 37 to 39 wt. %, preferably about 38 wt. %, based on the total weight of the composition (C).

Polyphenylsulfone (PPSU) Polymer

As said, the polymer composition (C) comprises at least one (PPSU) polymer.

In a preferred embodiment, more than 75% by moles more preferably more than 90% by moles, more preferably more than 99% by moles, even more preferably substantially all the recurring units of the (PPSU) polymer are recurring units ($R_{PPSU}$) of formula (A), chain defects, or very minor amounts of other units might be present, being understood that these latter do not substantially modify the properties.

The (PPSU) polymer may be notably a homopolymer, or a copolymer such as a random or a block copolymer. When the (PPSU) polymer is a copolymer, its recurring units are advantageously a mix of recurring units ($R_{PPSU}$) of formula (A) and of recurring units ($R_{PPSU}*$), different from recurring units ($R_{PPSU}$), such as notably recurring units of formula (D), (E) or (F) represented hereafter:

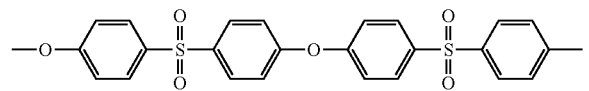

(D)

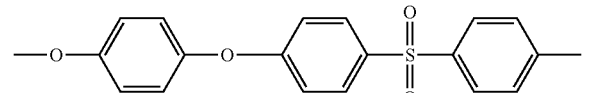

(E)

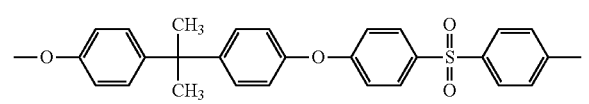

(F)

and mixtures thereof.

The (PPSU) polymer can also be a blend of the previously described homopolymer and copolymers.

RADEL® R PPSU from Solvay Specialty Polymers USA, L.L.C. is an example of a commercially available polyphenylsulfone homopolymer.

(PPSU) polymers can be prepared by known methods.

The (PPSU) polymer preferably has a melt flow rate (MFR) greater than or equal to 5 g/10 min at 365° C. and under a load of 5.0 kg, preferably greater than or equal to 10 g/10 min at 365° C. and under a load of 5.0 kg, more preferably greater than or equal to 14 g/10 min at 365° C. and under a load of 5.0 kg, as measured in accordance with ASTM method D1238; to measure said melt flow rate, a Tinius Olsen Extrusion Plastometer melt flow test apparatus may be used.

An upper boundary for the melt flow rate of the (PPSU) polymer is not critical and may be selected by a person skilled in the art. Preferably, the (PPSU) polymer may have a melt flow rate of at most 100 g/10 min, preferably at most 60 g/10 min, more preferably at most 40 g/10 min, when measured in accordance with ASTM method D1238 at 365° C. and under a load of 5.0 kg.

According to certain embodiments, the composition (C) may comprise a (PPSU) polymer having a melt flow rate ranging from about 5 g/10 min to about 60 g/10 min, preferably about 10 g/10 min to about 60 g/10 min, preferably about 20 g/10 min to about 60 g/10 min, preferably about 20 g/10 min to about 40 g/10 min, measured as described above.

The (PPSU) polymer weight average molecular weight may range from 20,000 to 100,000 grams per mole (g/mol) as determined by gel permeation chromatography using ASTM D5296 with polystyrene standards. In some embodiments the PPSU polymer weight average molecular weight ranges from 40,000 to 80,000 grams per mole (g/mol).

In the polymer composition (C), the (PPSU) polymer may be present in an amount of at least 2 wt. %, preferably at least 3 wt. %, more preferably at least 4 wt. %, even more preferably at least 5 wt. %, based on the total weight of the polymer composition (C).

The (PPSU) polymer may also be present in an amount of at most 25 wt. %, preferably at most 20 wt. %, more preferably at most 15 wt. %, still more preferably at most 10 wt. %, based on the total weight of the polymer composition (C).

Preferably, the (PPSU) polymer is present in an amount ranging from about 2 to about 20 wt. %, preferably from about 3 to about 15 wt. %, preferably from about 3 to about 10 wt. %, preferably from about 3 to about 7 wt. %, preferably from about 4 to about 6 wt. %, based on the total weight of the polymer composition (C). Most preferably, the amount of the PPSU polymer is about 5%.

(PES) Polymer

As said, more than 50% by moles of the recurring units are recurring units ($R_{PES}$) of formula (C), as detailed above. Preferred recurring units ($R_{PES}$) are those complying with formula (D), shown below:

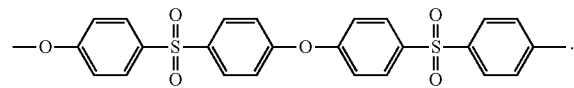

(D)

Preferably more than 75% by moles, preferably more than 85% by moles, preferably more than 95% by moles, preferably more than 99% by moles of the recurring units of the (PES) polymer are recurring units of formula (C). Most preferably all or essentially all of the recurring units of the polyethersulfone are recurring units of formula (C), chain defects, or very minor amounts of other units might be present, it being understood that these latter do not substantially modify the properties of the polymer.

In a preferred embodiment, more than 75% by moles, more preferably more than 90% by moles, more preferably more than 99% by moles, even more preferably substantially all or essentially all of the recurring units of the (PES)

polymer are of Formula (D), chain defects, or very minor amounts of other units might be present, it being understood that these latter do not substantially modify the properties.

The (PES) polymer may be a homopolymer or a copolymer such as a random or a block copolymer. When the (PES) polymer is a copolymer, its recurring units are preferably a mix of recurring units ($R_{PES}$) of Formula (D) and of recurring units ($R_{PES}*$). These recurring units ($R_{PES}*$) can be selected from those of Formulae (L), (M) and (Q) below:

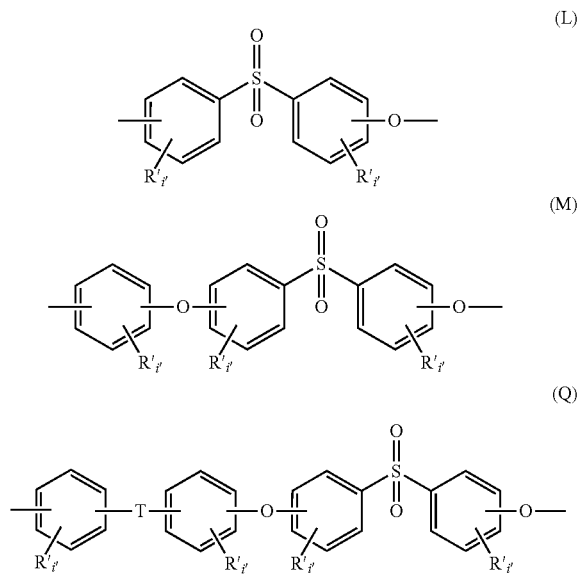

wherein:
- each of R', equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
- each of i', equal to or different from each other and at each occurrence, is independently zero or is an integer from 1 to 4;
- each of T, equal to or different from each other, is selected from a bond, —$CH_2$—; —O—; —S—; —C(O)—; —C($CH_3$)$_2$—; —C($CF_3$)$_2$—; —C(=$CCl_2$)—; —C($CH_3$)($CH_2CH_2COOH$)—; —N=N—; —$R^a$C=$CR^b$—; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; —($CH_2$)$_q$— and —($CF_2$)$_q$—, wherein q is an integer ranging from 1 to 6, or an aliphatic divalent group, linear or branched, of up to 6 carbon atoms; and mixtures thereof.

Specific recurring units ($R_{PES}*$) can be selected from those of formula (A), (E) and (F) below:

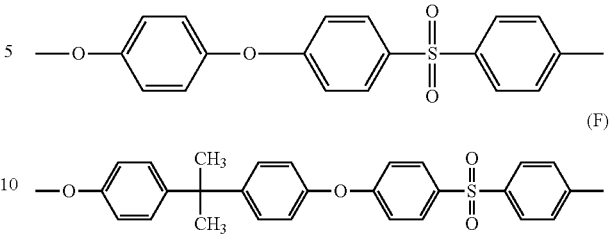

and mixtures thereof.

The (PES) polymer can also be a blend of the previously described homopolymer and copolymer.

An exemplary (PES) polymer is available as VERADEL® PES from Solvay Specialty Polymers USA, L.L.C.

(PES) polymers can be prepared by known methods.

The (PES) polymer may have a melt flow rate (MFR) at 380° C. and under a load of 2.16 kg according to ASTM D1238 of greater than 35 g/10 min, preferably greater than or equal to 40 g/10 min, preferably greater than or equal to 45 g/10 min, preferably greater than or equal to 50 g/10 min, preferably greater than or equal to 55 g/10 min, preferably greater than or equal to 60 g/10 min, preferably greater than or equal to 65 g/10 min, preferably greater than or equal to 70 g/10 min, preferably greater than or equal to 75 g/10 min, preferably greater than or equal to 80 g/10 min.

The (PES) polymer may have a melt flow rate (MFR) at 380° C. and under a load of 2.16 kg according to ASTM D1238 ranging from greater than 35 g/10 min to about 100 g/10 min, preferably from about 36 g/10 min to about 100 g/10 min, preferably from about 36 g/10 min to about 95 g/10 min, preferably from about 36 g/10 min to about 90 g/10 min, preferably from about 36 g/10 min to about 85 g/min, preferably from about 40 g/10 min to about 85 g/10 min, preferably from about 45 g/10 min to about 85 g/10 min, preferably from about 50 g/10 min to about 85 g/10 min, preferably from about 55 g/10 min to about 85 g/10 min, preferably from about 60 g/10 min to about 85 g/10 min, and most preferably from about 65 g/10 min to about 85 g/10 min.

To measure the melt flow rate, a Tinius Olsen Extrusion Plastometer melt flow test apparatus may be used.

An upper boundary for the melt flow rate of the (PES) polymer is not critical and may be selected by one of skill in the art. It is nevertheless understood that when the (PES) polymer may possesses a melt flow rate of at most 100 g/10 min, preferably at most 80 g/10 min, when measured in accordance with ASTM method D1238 at 380° C. and under a load of 2.16 kg.

In exemplary embodiments, the VERADEL® PES weight average molecular weight may range from 20,000 to 100,000 grams per mole (g/mol) as determined by gel permeation chromatography using ASTM D5296 with polystyrene standards. In some embodiments the VERADEL® PES weight average molecular weight may range from 40,000 to 80,000 grams per mole (g/mol).

The weight percent of the (PES) polymer in the composition (C) is preferably at least 10 wt. %, preferably of at least 20 wt. %, more preferably of at least 30 wt. %, based on the total weight of the composition (C). It is further understood the weight percent of the (PES) polymer in the composition (C) will generally be of at most 85 wt. %, more preferably of at most 80 wt. %, more preferably of at most 75 wt. %, more preferably of at most 70 wt. %, based on the total weight of the composition (C).

The weight percent of the (PES) polymer in the composition (C) preferably ranges from about 1 to about 90 wt. %, preferably from about 5 to about 80 wt. %, preferably from about 10 to about 70 wt. %, preferably from about 15 to about 60 wt. %, preferably from about 20 to about 50 wt. %, preferably from about 25 to about 40 wt. %, preferably from about 25 to about 35 wt. %, preferably from about 25 to about 30 wt. %, preferably from about 26 to about 28 wt. %. Most preferably, the weight percent of the (PES) polymer is about 27 wt. %.

Reinforcing Fillers

A large selection of reinforcing fillers may be added to the composition (C). They are preferably selected from fibrous and particulate fillers. A fibrous reinforcing filler is considered herein to be a material having length, width and thickness, wherein the average length is significantly larger than both the width and thickness. Preferably, such a material has an aspect ratio, defined as the average ratio between the length and the smallest of the width and thickness of at least 5. Preferably, the aspect ratio of the reinforcing fibers is at least 10, more preferably at least 20, still more preferably at least 50.

Preferably, the reinforcing filler is selected from mineral fillers, such as notably talc, mica, titanium dioxide, kaolin, calcium carbonate, calcium silicate, magnesium carbonate); glass fiber; carbon fibers such as notably graphitic carbon fibers (some of them having possibly a graphite content of greater than 99%), amorphous carbon fibers, pitch-based carbon fibers (some of them having possibly a graphite content of greater than 99%), PAN-based carbon fibers; synthetic polymeric fiber; aramid fiber; aluminum fiber; aluminum silicate fibers; oxide of metals of such aluminum fibers; titanium fiber; magnesium fiber; boron carbide fibers; rock wool fiber; steel fiber; asbestos; wollastonite; silicon carbide fibers; boron fibers, graphene, carbon nanotubes (CNT) and the like.

In one embodiment, the filler is a fibrous filler. Preferably, the fibrous filler is glass fibers. Preferably, the fibrous filler is a continuous fibrous filler. One or more fillers may be used.

In other embodiments, the filler is non-fibrous.

Glass fibers are silica-based glass compounds that contain several metal oxides which can be tailored to create different types of glass. The main oxide is silica in the form of silica sand; the other oxides such as calcium, sodium and aluminum are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers. The glass fibers have generally an equivalent diameter of 5 to 20 preferably of 5 to 15 μm and more preferably of 5 to 10 μm. All glass fiber types, such as A, C, D, E, M, S, R, T glass fibers (as described in chapter 5.2.3, pages 43-48 of *Additives for Plastics Handbook*, 2nd ed, John Murphy), or any mixtures thereof or mixtures thereof may be used. For example, R, S and T glass fibers are high modulus glass fibers that have typically an elastic modulus of at least 76, preferably at least 78, more preferably at least 80, and most preferably at least 82 GPa as measured according to ASTM D2343.

E, R, S and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. To the contrary of the regular E-glass fibers widely used in polymer compositions, R, S and T glass fibers comprise less than 10 wt. % of CaO.

Preferably, the fibrous filler, in particular the glass fiber, is formulated with a high temperature sizing. The Applicant observed that said high temperature sizing provided superior interfacial adhesion with polymers that require generally to be processed at high temperatures, like (PEEK), (PEKK) and (PPSU) polymers.

According to exemplary embodiments, the glass fiber may have a non-circular cross section and an elastic modulus of at least 76 GPa as measured according to ASTM C1557-03.

The glass fibers, may have a non-circular cross section (so called "flat glass fibers"), including oval, elliptical or rectangular.

The fibrous filler, in particular the glass fibers, may have a cross-sectional longest diameter of at least 15 μm, preferably at least 20 μm, more preferably at least 22 μm, still more preferably at least 25 μm. It is advantageously of at most 40 μm, preferably at most 35 μm, more preferably at most 32 μm, still more preferably at most 30 μm. Excellent results were obtained when the cross-sectional longest diameter was in the range of 15 to 35 preferably of 20 to 30 μm and more preferably of 25 to 29 μm.

The fibrous filler, in particular the glass fibers may have a cross-sectional shortest diameter of at least 4 μm, preferably at least 5 μm, more preferably at least 6 μm, still more preferably at least 7 μm. It is advantageously of at most 25 μm, preferably at most 20 μm, more preferably at most 17 μm, still more preferably at most 15 μm. Excellent results were obtained when the cross-sectional shortest diameter was in the range of 5 to 20 preferably of 5 to 15 μm and more preferably of 7 to 11 μm.

The fibrous filler, in particular the glass fibers may have an aspect ratio of at least 2, preferably at least 2.2, more preferably at least 2.4, still more preferably at least 3. The aspect ratio is defined as a ratio of the longest diameter in the cross-section of the glass fiber to the shortest diameter thereof. Also, the aspect ratio of the glass fibers is of at most 8, preferably at most 6, more preferably of at most 4. Excellent results were obtained when said ratio was of from about 2 to about 6, and preferably, from about 2.2 to about 4.

The shape of the cross-section of the glass fiber, its length, its cross-sectional diameter and its aspect ratio can be easily determined using optical microscopy. For example, the aspect ratio of the fiber cross-section may be determined using an Euromex optical microscope and an image analysis software (Image Focus 2.5) by measuring the largest (width) and smallest (height) dimensions of the fiber cross-section and dividing the first number by the second number.

The glass fibers may have an elastic modulus of at least 76 GPa as measured according to ASTM C1557-03, preferably at least 78, more preferably at least 80, even more preferably at least 82 and most preferably at least 84 GPa, as measured according to ASTM C1557-03.

Also, the glass fibers of the polymer composition (C) have a tensile strength of at least 3.5 GPa as measured according to ASTM C1557-03, preferably at least 3.6, more preferably at least 3.7, even more preferably at least 3.8 and most preferably at least 3.9 GPa, as measured according to ASTM C1557-03.

This level of elastic modulus and tensile strength is typically reached when using a specific chemical composition of the glass used to manufacture the glass fibers. Glass is a silica-based glass compound that contain several metal oxides which can be tailored to create different types of glasses. The main oxide is silica in the form of silica sand; the other oxides such as calcium, sodium and aluminum are incorporated to reduce the melting temperature and impede crystallization. It is well known in the art that when using a glass with a high loading of $Al_2O_3$, the glass fiber derived therefrom exhibit a high elastic modulus. In particular, those glass fibers comprise typically from 55-75 wt. % of $SiO_2$, from 16-28 wt. % of $Al_2O_3$ and from 5-14 wt. % of MgO, based on the total weight of the glass composition. To the contrary of the regular E-glass fibers widely used in polymer compositions, the high modulus glass fibers comprise less than 5 wt. % of $B_2O_3$, preferably less than 1 wt. %.

The glass fiber may be manufactured by well known techniques such as the one described in U.S. Pat. No. 4,698,083 using a glass composition featuring a high loading of $Al_2O_3$, typically from 16-28 wt. % of $Al_2O_3$, based on the total weight of the glass composition.

According to one embodiment, the glass fiber may be coated with a predetermined material on a surface thereof in order to tailor reaction with the polymer(s) and other ingredients of the polymer composition (C) and improve the polymer/glass bonding. The coating material may change the performance of a glass fiber-reinforced polymer composition.

In another embodiment, the reinforcing filler in the polymer composition (C) is a carbon fiber.

For the purpose of the present invention, the term "carbon fiber" is intended to include graphitized, partially graphitized and ungraphitized carbon reinforcing fibers or a mixture thereof.

For the purpose of the present invention, the term "fiber" means a fundamental form of solid (often crystalline) characterized by relative high tenacity and a high ratio of length to diameter.

The term "graphitized" intends to denote carbon fibers obtained by high temperature pyrolysis (over 2000° C.) of carbon fibers, wherein the carbon atoms place in a way similar to the graphite structure.

Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials.

Carbon fibers useful for the present invention are preferably chosen from the group composed of PAN-based carbon fibers (PAN-CF), pitch based carbon fibers, graphitized pitch-based carbon fibers, and mixtures thereof.

PAN-based carbon fibers (PAN-CF) have advantageously a diameter of between 3 to 20 μm, preferably from 4 to 15 μm, more preferably from 5 to 10 μm, most preferably from 6 to 8 μm. Good results were obtained with PAN-based carbon fibers (PAN-CF) having a diameter of 7 μm.

The PAN-CF may be of any length. In general, the length of PAN-CF is at least 50 μm.

Graphitized pitch-based carbon fibers are readily available from commercial sources containing at least about 50% weight graphitic carbon, greater than about 75% weight graphitic carbon, and up to substantially 100% graphitic carbon. Highly graphitic carbon fiber particularly suitable for use in the practice of this invention may be further characterized as highly conductive, and such fiber is generally used having a modulus of about 80 to about 120 million pounds per square inch, i.e., million $lbs/in^2$ (MSI). In certain embodiments the highly graphitic carbon fiber has a modulus of about 85 to about 120 MSI, and in other certain embodiments about 100 to about 115 MSI.

The pitch-based-CF has advantageously a diameter between 5 to 20 μm, preferably from 7 to 15 μm, more preferably from 8 to 12 μm.

The pitch-based-CF may be of any length. The pitch-based-CF has advantageously a length from 1 μm to 1 cm, preferably from 1 μm to 1 mm, more preferably from 5 μm to 500 μm and still more preferably from 50 to 150 μm.

Carbon fiber may be employed as chopped carbon fiber or in a particulate form such as may be obtained by milling or comminuting the fiber. Comminuted graphitized pitch-based carbon fiber suitable for use in the practice of the invention may be obtained from commercial sources including from Cytec Carbon Fibers as ThermalGraph DKD X and CKD X grades of pitch-based carbon fiber and Mitsubishi Carbon Fibers as Dialead carbon fibers. Chopped PAN-based carbon fibers preferably used in the present invention may be obtained from commercial sources.

The reinforcing filler is preferably present in the polymer composition (C), in an amount of at least 5 wt. %, preferably at least 10 wt. %, more preferably at least 15 wt. %, based on the total weight of the polymer composition (C).

The reinforcing filler is also preferably present in an amount of at most 45 wt. %, more preferably at most 40 wt. %, still more preferably at most 30 wt. %, based on the total weight of the polymer composition (C).

Preferably, the amount of the reinforcing filler ranges from about 0.1 wt. % to about 50 wt. %, preferably from about 5 wt. % to about 45 wt. %, preferably from about 10 wt. % to about 40 wt. %, preferably from about 15 wt. % to about 35 wt. %, preferably from about 20 wt. % to about 35 wt. %, preferably from about 25 wt. % to about 35 wt. %, preferably from about 28 wt. % to about 32 wt. %. Preferably the amount of the reinforcing filler is about 30 wt. % of the polymer composition (C).

Other Ingredients

The polymer composition (C) may further optionally comprise other ingredients (I) such as a colorant such as notably a dye and/or a pigment such as notably titanium dioxide, zinc sulfide and zinc oxide, ultraviolet light stabilizers, heat stabilizers, antioxidants such as notably organic phosphites and phosphonites, acid scavengers, processing aids, nucleating agents, internal lubricants and/or external lubricants, flame retardants, a smoke-suppressing agents, an anti-static agents, anti-blocking agents, and/or conductivity additives such as carbon black and carbon nanofibrils.

The polymer composition (C) may also further comprise other polymers different from the (PAEK) polymer, (PPSU) polymer and the (PES) polymer, as detailed above. In particular, the polymer composition (C) may further comprise polymers such as polyetherimides, polycarbonates, polyphenylenes, polyesters and polyphenylene sulfides. Their addition can be useful notably when the composition (C) must meet certain particular requirements, as needed by certain special end uses.

When one or more other ingredients are present, their total weight, based on the total weight of polymer composition (C), is preferably less than 20%, preferably less than 10%, more preferably less than 5% and even more preferably less than 2%.

The composition (C) of the invention preferably consists essentially of the (PAEK) polymer, as detailed above, the (PPSU) polymer, as detailed above, the (PES) polymer, as detailed above, the reinforcing filler, as detailed above, and optionally, other ingredients (I), as detailed above.

The expression "consisting essentially of" as used herein is intended to denote that any additional ingredient different from the (PAEK) polymer, as detailed above, the (PPSU) polymer, as detailed above, the (PES) polymer, as detailed above, the reinforcing filler, as detailed above, and optionally, other ingredients (I) is present in an amount of at most 1% by weight, based on the total weight of the composition (C).

In exemplary embodiments, the composition (C) comprises or consists essentially of:
from 35 to 75 wt. % of at least one (PEEK) polymer,
from 3 to 15 wt. % of at least one (PPSU) polymer,
from 30 to 70 wt. % of at least one (PES) polymer; and
from 15 to 30 wt. % of glass fibers,
wherein all % are based on the total weight of the composition (C).

According to exemplary embodiments, the composition (C) exhibits a tensile breaking strength measured according to ASTM D638 of greater than or equal to about 30,000 psi, preferably greater than or equal to about 30,500 psi, preferably greater than or equal to about 31,000 psi, preferably greater than or equal to about 31,500 psi.

According to exemplary embodiments, the composition (C) exhibits a tensile elongation at break measured according to ASTM D638 of greater than or equal to about 2.6%, preferably greater than or equal to about 2.7%.

According to exemplary embodiments, the composition (C) exhibits a notched Izod impact resistance measured according to ASTM D256 of greater than or equal to about 1.9 ft-lb/in, preferably greater than or equal to about 2.0 ft-lb/in, preferably greater than or equal to about 2.1 ft-lb/in.

According to exemplary embodiments, the composition (C) exhibits a no notch Izod impact resistance measured according to ASTM D4812 of greater than or equal to about 21 ft-lb/in, preferably greater than or equal to about 22 ft-lb/in, preferably greater than or equal to about 23 ft-lb/in.

A person of ordinary skill in the art will recognize that compositions exhibiting any combination of the physical, chemical, and mechanical properties described herein are contemplated and within the scope of the present disclosure.

The composition (C) can be prepared by a variety of methods involving intimate admixing of the polymer materials with any optional ingredient, as detailed above, desired in the formulation, for example by melt mixing or a combination of dry blending and melt mixing. Typically, the dry blending of the (PAEK) polymer, as detailed above, the (PPSU) polymer, as detailed above, the (PES) polymer, as detailed above, the reinforcing filler, as detailed above, and optionally, other ingredients (I) is carried out by using high intensity mixers, such as notably Henschel-type mixers and ribbon mixers.

Such a powder mixture may comprise the (PAEK) polymer, as detailed above, the (PPSU) polymer, as detailed above, the (PES) polymer, as detailed above, the reinforcing filler, as detailed above, and optionally, other ingredients (I) in the weight ratios as described above. Exemplary compositions are suitable for manufacturing finished articles by melt fabrication processes such as injection molding or extrusion, or can be a concentrated mixture to be used as masterbatch and diluted in further amounts of the (PAEK) polymer, as detailed above, the (PPSU) polymer, as detailed above, the (PES) polymer, as detailed above, the reinforcing filler, as detailed above, and optionally, other ingredients (I) in subsequent processing steps.

It is also possible to manufacture the composition by further melt compounding the powder mixture as above described. As said, melt compounding can be effected on the powder mixture as above detailed, or preferably directly on the (PAEK) polymer, as detailed above, the (PPSU) polymer, as detailed above, the (PES) polymer, as detailed above, the reinforcing filler, as detailed above, and optionally, other ingredients (I). Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be chosen so that sufficient heat and mechanical energy is provided to fully melt the powder mixture or the ingredients as above detailed and obtain a homogeneous distribution of the different ingredients. Provided that optimum mixing is achieved between the bulk polymer and filler contents. In exemplary embodiments the composition (C) may be used to form strand extrudates which may not be ductile. Such strand extrudates can be chopped by means e.g. of a rotating cutting knife after cooling on a conveyer with, for example, water spray. Thus, for example, composition (C) which may be present in the form of pellets or beads can then be further used for the manufacture of articles.

Exemplary embodiments also include articles comprising the above described polymer composition (C).

The articles may be made from the polymer composition (C) using any suitable melt-processing method. In particular, they may be made by injection molding or extrusion molding.

The polymer composition (C) may be well suited for the manufacture of articles useful in a wide variety of end uses.

Non limitative examples of articles according to the present invention are:
plumbing articles used for the transportation of water or other fluids under pressure such as fittings, rings, faucets, valves and manifolds. Common applications thereof include domestic hot and cold water, radiator heating systems, floor and wall heating and cooling systems, compressed air systems and piping systems for natural gas;
medical/dental/healthcare articles such as medical instruments or parts of instruments (notably handles and viewing glasses), components of medical equipments that handle or dispense chemicals used in medical procedures (such as anesthesia), cases and trays used to hold such instruments;
aircraft interiors articles such as panels and components (duct elements, structural brackets, fasteners, cabin interior components or other light or medium duty structural elements and components) on aircraft;
food service articles such as warming trays, steam table trays, plastic cook ware;
dairy equipment articles such as piping systems used for the collection or transportation of milk and other dairy products;
laboratory animal cages;
laboratory equipment articles such as funnels, filter device and other lab equipments;
electronic articles such as structural parts of electronic devices electric and electromagnetic wire insulation coatings
mobile electronics structural and or other functional elements and components
parts for automotive under-the-hood uses that encounter elevated temperatures and/or aggressive chemical environments
parts and components for pumping and delivery of chemicals, solvents, oils or organic fluids at room temperature and elevated temperatures. This includes piping and fittings used in the chemical process industry and in hydraulics and in heat transfer fluid delivery systems.

In exemplary embodiments, the article includes at least one wall or section with a thickness of less than 7 mm, preferably less than 5 mm, preferably less than 3 mm.

Should the disclosure of any patents, patent applications, and publications which are incorporated herein by reference conflict with the description of the present application to the extent that it may render a term unclear, the present description shall take precedence.

EXAMPLES

The invention will be now described in more detail with reference to the following examples, whose purpose is merely illustrative and not intended to limit the scope of the invention.

Starting Materials

The PAEK used in the examples was KetaSpire® PEEK having melt viscosities ranging from 0.07 to 0.15 kPa-s, available from Solvay Specialty Polymers USA., LLC. The melt viscosity was measured by capillary rheometer at a temperature of 400° C. and a shear rate of 1000 s$^{-1}$.

The PAES grade used in the examples was Veradel® 3600 PES, a high flowing/low viscosity grade of PES available from Solvay Specialty Polymers USA, LLC, having a melt flow rate when measured at 380° C. and under a load of 2.16 kg in the range 65-85 g/10 min using the ASTM D1238 melt flow rate test. This grade of PES is particularly suitable for injection molding.

Two comparative examples (6 and 7) shown in Table 3 were prepared with Veradel® PES grades A-301 NT and A-201 NT, respectively, which are grades with nominal melt flows ranging from 25 to 35 and 15 to 25 g/10 min, respectively, when measured at 380° C. and under a piston load of 2.16 kg.

The PPSU grade used in some of the formulations was Radel® R-5900 NT PPSU, which is available from Solvay Specialty Polymers USA, LLC. This is a high flowing grade of PPSU having a melt flow rate ranging from 26 to 36 according to ASTM D1238 under the test conditions of 365° C. and 5.0 kg weight.

The reinforcement used in all the examples was chopped glass fiber of the following grades:

OCV 910A: An E-glass chopped fiberglass from Owens Corning Vetrotex having a nominal fiber diameter of 11 microns. This glass fiber has a round (circular) cross-section.

CSG3PA-820: An E-glass fiber from Nittobo that has a "flat" or rectangular/ribbon-like cross section where the width of the fiber cross section is about four times its thickness.

AGY S2 9 Micron: An S-glass chopped fiber from AGY that has a nominal fiber diameter of 9 microns and a round fiber cross-section.

Other additives that were used in the formulations were:

Zinc Sulfide: The zinc sulfide grade used was Sachtolith-L® from Sachtlieben Corporation. This additive was used as a pigment in some of the formulations.

Zinc Oxide: Aktiv® available from Lanxess Corp was used as a melt processing thermal stabilizer in some of the formulations.

Preparation of Formulations

The polymer blends of the examples and comparative examples were prepared by first tumble blending pellets and/or powders of the resins and additives to be blended, other than the glass fiber, at the desired compositional ratios for about 20 minutes, followed by melt compounding using either a 26 mm diameter Coperion ZSK-26 co-rotating partially intermeshing twin screw extruder having an L/D ratio of 48:1, or a Berstorff 25 mm twin screw co-rotating partially intermeshing extruder having eight barrel sections and an L/D ratio of 40:1. When the Coperion ZSK-26 extruder was used for compounding, the barrel sections 2 through 12 and the die were heated to set point temperatures as follows:
Barrel 2: 345° C.
Barrels 4-6: 365° C.
Barrel 7: 360° C.
Barrel 8: 350° C.
Barrels 9-12: 340° C.
Die: 340° C.

And when the Berstorff 25 mm extruder was used, the eight barrel sections and die were set to the temperatures as indicated below:
Barrels 2-4: 330° C.
Barrels 5-8: 340° C.
Adapter and Die: 340° C.

In each case, the resins and additives other than fiberglass were fed at barrel section 1 using a gravimetric feeder at throughput rates in the range 6-13-kg/hr while the glass fiber was fed to the extruder at barrel section 7 (ZSK) and 5 (Berstorff) at a nominal throughput rate 30% of the total throughput rate. The extruder was operated at screw speeds in the range 180-200 RPM. A single-hole die was used for all the compounds and the molten polymer strand exiting the die was cooled in a water trough and then cut in a pelletizer to form pellets approximately 3.0 mm in length by 2.7 mm in diameter.

Injection Molding

Injection molding was performed with the example formulations to produce 3.2 mm (0.125 in) thick ASTM tensile and flexural specimens for mechanical property testing. Type I tensile ASTM specimens and 5 in×0.5 in×0.125 in flexural specimens were injection molded using PEEK injection molding guidelines provided by the supplier.

Testing of Formulations

Mechanical properties were tested for all the formulations using injection molded 0.125 inch thick ASTM test specimens which consisted of 1) Type I tensile bars, 2) 5 in×0.5 in×0.125 in flexural bars, and 3) 4 in×4 in×0.125 in plaques for the instrumented impact (Dynatup) testing. The following ASTM test methods were employed in evaluating all compositions:

D638: Tensile properties: tensile strength at break, tensile modulus and tensile elongation at break
D790: Flexural properties: flexural strength at break, flexural modulus and flexural strain at break
D256: Notched Izod impact resistance
D4812: Unnotched Izod impact resistance
D3835: Melt viscosity by capillary rheometry Melt viscosity was measured at a temperature of 400° C. and at shear rates ranging from 100 to 10000 l/s. For the purpose of comparison between different materials, the melt viscosity at the intermediate shear rate of 1000 l/s was used.

Experimental Results

The formulations of the examples and comparative examples are shown in Tables 1-3. The examples and comparative examples all contained 30% chopped glass fiber and were either PEEK with glass fiber or blends of PEEK with one or more PAES. Zinc oxide was optionally used at low level (0.1%) in some of the formulations of the examples or comparative examples. Zinc sulfide was also used at 3.0 phr in most formulations as a pigment. The mechanical properties and melt viscosities of the examples and comparative examples are also shown in Tables 1-3.

TABLE 1

|  | Comp. Ex. 1 | Comp. Ex. 2 | Example 1 |
|---|---|---|---|
| Components |  |  |  |
| KetaSpire KT-880P, MV = 0.11 kPa-s | 70.0 | 41.0 | 38.0 |
| PES, Veradel 3600 NT | — | 29.0 | 27.0 |
| Radel R-5900 NT | — | — | 5.0 |
| OCV 910A Fiberglass | 30.0 | 30.0 | 30.0 |
| Zinc Sulfide, Sachtolith-L | — | 3.0 phr | 3.0 phr |
| Tests |  |  |  |
| Tensile Breaking Strength (psi) | 26600 [82] | 26800 [300] | 27200 [30] |
| Tensile Modulus (Ksi) | 1650 [32] | 1675 [18] | 1657 [25] |
| Tensile Elongation at Break (%) | 2.8 [0.05] | 2.4 [0.08] | 2.7 [0.05] |
| Flex Strength (psi) | 39700 [233] | 36360 [687] | 37900 [370] |
| Flex Modulus (Ksi) | 1580 [8] | 1520 [7] | 1517 [9] |
| Flex Strain at Break (%) | 3.0 [0.04] | 2.7 [0.07] | 2.8 [0.04] |
| Notched Izod (ft-lb/in) | 1.4 [0.04] | 1.4 [.02] | 1.7 [.05] |
| No Notch Izod (ft-lb/in) | 15.0 [0.9] | 15 [1.2] | 18.2 [1.4] |
| MV at 1002 1/s and 400 C. (Pa-s) | 0.26 | 0.22 | 0.24 |

[ ] = Standard deviations phr = weight parts per hundred parts of resin where resin is everything except zinc sulfide.

TABLE 2

|  | Comp. Ex. 3 | Comp. Ex. 4 | Example 2 | Example 3 |
|---|---|---|---|---|
| Components |  |  |  |  |
| KetaSpire KT-880P, MV = 0.11 kPa-s | 37.94 | 37.94 | 37.94 | — |
| KetaSpire KT-880P, MV = 0.08 kPa-s | — | — | — | 38.0 |
| PES, Veradel A-201 NT | — | 26.96 | — | — |
| PES, Veradel A-301 NT | 26.96 | — | — | — |
| PES, Veradel 3600 NT | — | — | 26.96 | 27.0 |
| Radel R-5900 NT | 5.0 | 5.0 | 5.0 | 5.0 |
| AGY S2, 9-micron dia Fiberglass - 553 Sizing | 30.0 | 30.0 | 30.0 | 30.0 |
| Zinc Oxide, Lanxess Zinc Oxyd Activ | 0.1 | 0.1 | 0.1 | — |
| Zinc Sulfide, Sachtolith-L | 3.0 phr | 3.0 phr | 3.0 phr | 3.0 phr |
| Tests |  |  |  |  |
| Tensile Breaking Strength (psi) | 29300 [144] | 29200 [119] | 31700 [209] | 32300 [240] |
| Tensile Modulus (Ksi) | 1878 [60] | 1900 [86] | 1823 [18] | 1867 [21] |
| Tensile Elongation at Break (%) | 2.5 [0.1] | 2.5 [0.1] | 2.7 [0.04] | 2.7 [0.1] |
| Flex Strength (psi) | 41200 [380] | 42200 [619] | 43700 [540] | 44500 [745] |
| Flex Modulus (Ksi) | 1690 [8.1] | 1720 [7.1] | 1694 [4.2] | 1730 [8] |
| Flex Strain at Break (%) | 2.8 [0.03] | 2.9 [0.07] | 3.0 [0.07] | 3.0 [0.06] |
| Notched Izod (ft-lb/in) | 1.8 [0.04] | 1.8 [0.04] | 2.1 [.07] | 2.1 [.06] |
| No Notch Izod (ft-lb/in) | 20 [0.7] | 20 [0.8] | 22 [1.1] | 23 [1] |
| MV at 1002 1/s and 400 C. (Pa-s) | 0.26 | 0.28 | 0.26 | 0.23 |

[ ] = Standard deviations phr = weight parts per hundred parts of resin where resin is everything except zinc sulfide.

TABLE 3

|  | Comp. Ex. 5 | Example 4 |
|---|---|---|
| Components |  |  |
| KetaSpire KT-880P, MV = 0.11 kPa-s | 70.0 | 38.0 |
| PES, Veradel 3600 NT | — | 27.0 |
| Radel R-5900 NT | — | 5.0 |
| Flat Fiberglass, CSG3PA-820 | 30.0 | 30.0 |
| Zinc Sulfide, Sachtolith-L | — | 3.0 phr |

TABLE 3-continued

|  | Comp. Ex. 5 | Example 4 |
|---|---|---|
| Tests |  |  |
| Tensile Breaking Strength (psi) | 25300 [226] | 26000 [112] |
| Tensile Modulus (Ksi) | 1705 [7] | 1654 [25] |
| Tensile Elongation at Break (%) | 2.0 [0.05] | 2.3 [0.06] |
| Flex Strength (psi) | 36000 [352] | 36170 [350] |
| Flex Modulus (Ksi) | 1557 [11] | 1510 [4] |
| Flex Strain at Break (%) | 2.6 [0.05] | 2.7 [0.04] |
| Notched Izod (ft-lb/in) | 1.7 [0.05] | 1.8 [.04] |
| No Notch Izod (ft-lb/in) | 12 [0.8] | 14 [.1] |
| MV at 1002 1/s and 400 C .(Pa-s) | 0.25 | 0.23 |

[ ] = Standard deviations
phr = weight parts per hundred parts of resin where resin is everything except zinc sulfide The data in the tables above illustrate that the formulations including a combination of PEEK, a PES having a melt flow greater than 35 g/10 min, and a small weight % of PPSU exhibit an unexpected combination of high mechanical properties along with very high melt flow characteristics (low melt viscosity). The data is presented in three logical groupings in Tables 1-3. Each of the example tables presents formulations utilizing a different type/grade of glass fiber. Because the glass fiber type may have a significant impact on mechanical properties, the examples are compared to comparative examples using the same glass fiber in each set of examples.

In Table 1, a comparison is shown between glass fiber reinforced PEEK (Comp. Ex. 1), a glass fiber reinforced blend of PEEK with high flow PES (Comp. Ex. 2), and a third formulation, prepared according to the invention—wherein a combination of PEEK, high flow PES and a small proportion of PPSU are used in the polymer portion of the formulation. All three formulations are 30% glass fiber reinforced. The mechanical properties of Example 1 show higher strength, higher elongation at break, and higher impact resistance than the blend where PPSU was not added to the formulation. In fact, the formulation of Example 1 exhibited tensile strength that is even higher than that of 30% glass fiber reinforced PEEK, which is surprising given the expectation that 30% glass fiber reinforced PES would be significantly lower in tensile strength than 30% glass fiber reinforced PEEK. The formulation of Example 1 also exhibits a lower viscosity than the viscosity of 30% glass fiber reinforced PEEK while offering a higher tensile strength and higher notched and unnotched impact resistance.

The examples of Table 2 illustrate that when the same glass fiber reinforced blend formulations were prepared with a high flow PES having a melt flow rate greater than 35 g/10 min (Examples 2 and 3), higher mechanical properties were unexpectedly achieved, including strength, elongation at break, and impact resistance relative to the same formulations prepared using PES polymer component having melt flow rates lower than or equal to 35 g/10 min. Example 2 used a PES having melt flow rate in the 65-85 g/10 min range. Comparative Examples 3 and 4 were the same formulation as Example 2 except that they used PESs having melt flow rates of 25-35 g/10 min and 15-25 g/10 min, respectively. The impact resistance (notched and unnotched Izod) advantage of Example 2 over Comparative Examples 3 and 4 is particularly surprising considering that higher impact resistance behavior is typically expected from higher molecular weight (i.e. lower melt flow rate) polymer ingredients in such formulations.

Lastly, Table 3 shows a comparison of a PEEK/high flow PES/PPSU/glass fiber formulation with a PEEK/glass fiber formulation. In this case, flat or ribbon-like glass fiber was used. In this comparison, the blend of Example 4 showed superior properties as well as lower viscosities relative to the glass fiber reinforced PEEK of Comparative Example 5. Again, the fact that the mechanical properties of the ternary blend prepared according to the invention (Example 4) exceed those of the reinforced PEEK (Comparative Example 5) is unexpected. The viscosity of the formulation of Example 4 is also lower than that of Comparative Example 5, consistent with the comparison between Example 1 and Comparative Example 1.

Thus, higher tensile strengths, impact resistance, and elongations at break were unexpectedly achieved for inventive blends as compared with formulations with polymer portions including only PEEK and PES (i.e., without the presence of PPSU in the formulation). Furthermore, and very unexpectedly, when the higher flow/lower molecular weight PES was used, the mechanical properties of the formulation, including strength, elongation at break and impact resistance, all improved relative to the analogous formulations containing low melt flow rate (≤35 g/10 min) PES, contrary the expectation that higher toughness properties are typically exhibited by reinforced materials when higher molecular weight polymeric ingredients are used in the formulation.

Polymers exhibiting a combination of exceptionally high mechanical properties coupled with very high flow rates may be useful in the fabrication of high strength and high toughness thin parts with reduced weight that are also easy to produce by injection molding (because of the very low viscosity). Such polymers may also exhibit excellent mechanical robustness and light weight for ease of portability (for example, for mobile electronics parts) or reduced fuel consumption (for example, in aerospace or commercial transport applications).

For maximum mechanical strength and toughness properties, round filament S glass is preferred as shown in Examples 2 and 3, while for the lowest viscosity and greatest ease of processability, flat glass fiber is preferred as shown in Example 4.

Should the disclosure of any patents, patent applications, and publications which are incorporated herein by reference conflict with the description of the present application to the extent that it may render a term unclear, the present description shall take precedence.

The invention claimed is:

1. A composition (C) comprising:
from 1 to 90 wt. % of at least one poly(aryl ether ketone), (PAEK) polymer, wherein more than 50% by moles of the recurring units of said (PAEK) polymer are recurring units ($R_{PAEK}$) comprising a Ar—C(O)—Ar' group, wherein:
Ar and Ar', equal to or different from each other, are aromatic groups, and the recurring units ($R_{PAEK}$) are selected from groups of formulae (J-A) to (J-P):

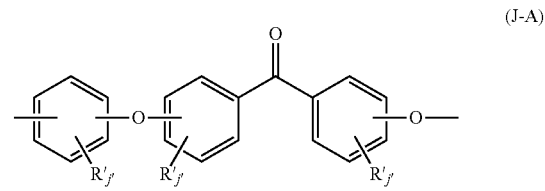

(J-A)

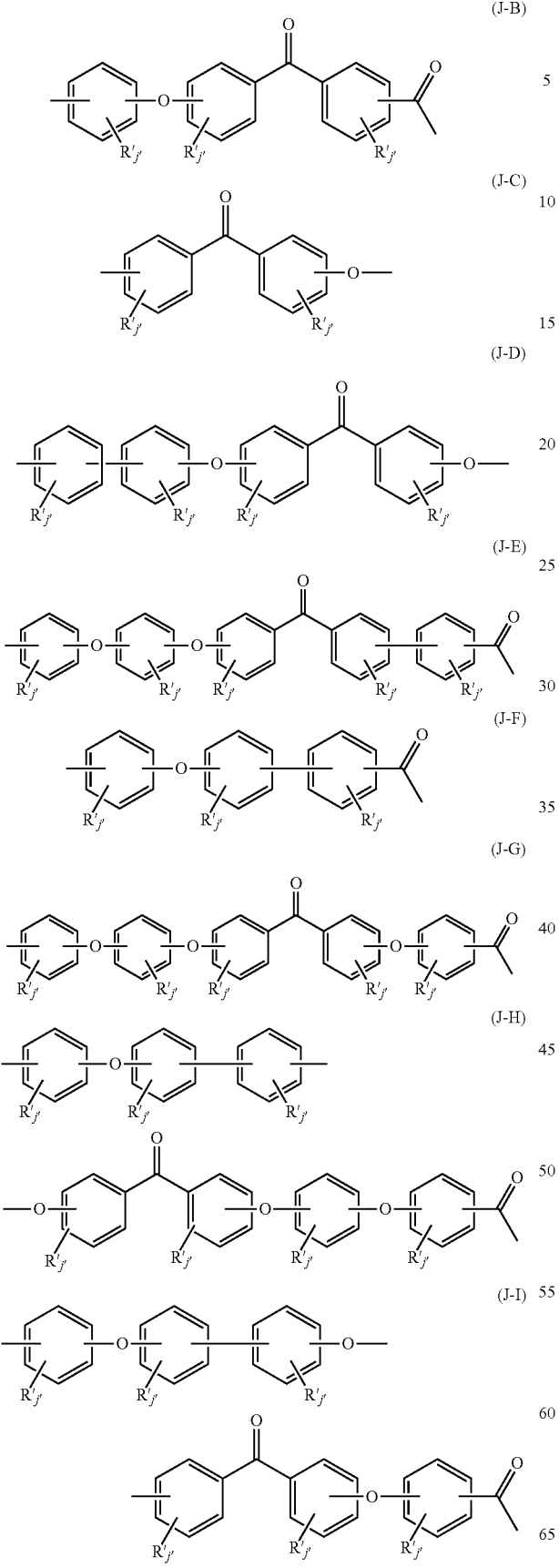
wherein:
each of R', equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and j is zero or an integer ranging from 1 to 4;

from 1 to 25 wt. % of at least one polyphenylsulfone polymer, (PPSU) polymer, wherein more than 50% by moles of the recurring units of said (PPSU) polymer are recurring units ($R_{PPSU}$) of formula (A):

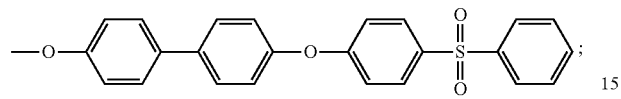
(A)

from 1 to 90 wt. % of at least one polyethersulfone polymer, (PES) polymer, wherein more than 50% moles of recurring units of the (PES) polymer are recurring units ($R_{PES}$) independently selected from units of formula (C):

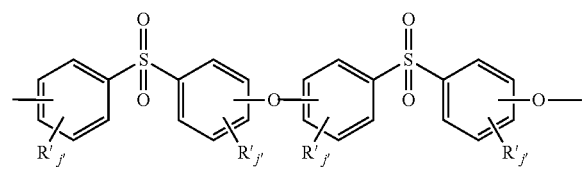
(C)

wherein:

each of R', equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and each of j', equal to or different from each other, is selected from 0, 1, 2, 3, or 4; and from 0.1 to 50 wt. % of at least one reinforcing filler, wherein:

all wt. % are based on the total weight of the composition (C), and the PES polymer has a melt flow rate (MFR) at a temperature of 380° C. and under a load of 2.16 kg according to ASTM D1238 of greater than 35 g/10 min.

2. The composition (C) of claim 1, wherein more than 50% moles of recurring units of the (PAEK) polymer are recurring units ($R_{PAEK}$) selected from formulae (J'-A) to (J'-P) herein below:

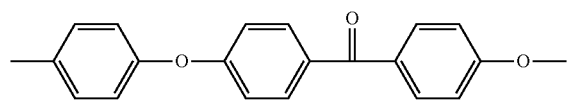
(J'-A)

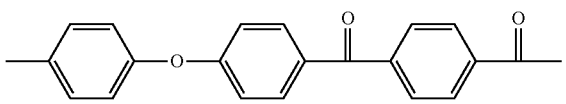
(J'-B)

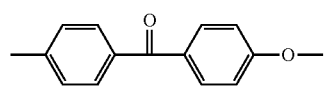
(J'-C)

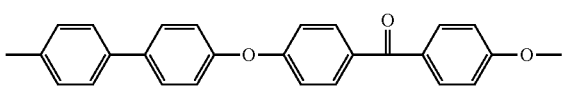
(J'-D)

(J'-E)

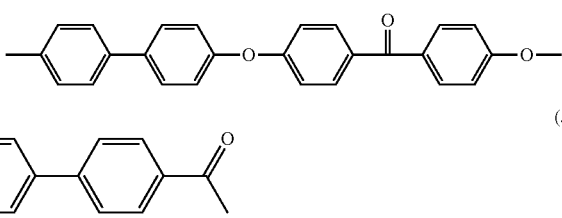

(J'-F)

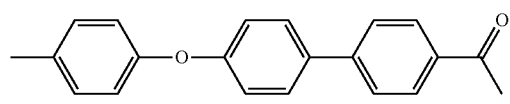

(J'-G)

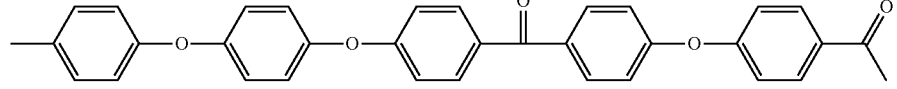

(J'-H)

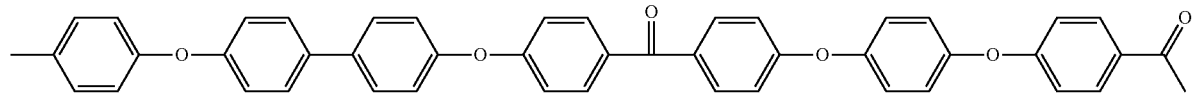

-continued

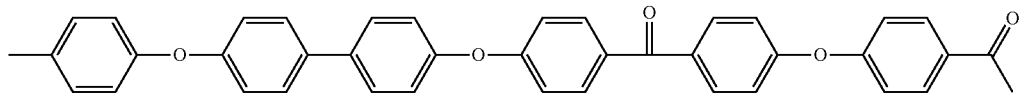
(J'-I)

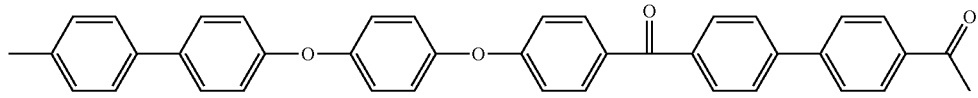
(J'-J)

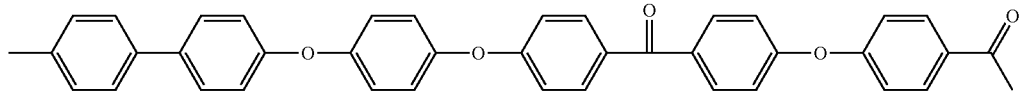
(J'-K)

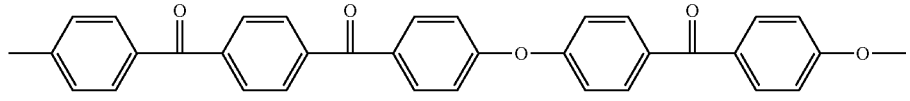
(J'-L)

(J'-M) 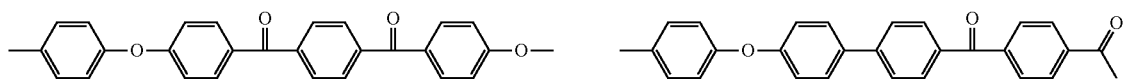 (J'-N)

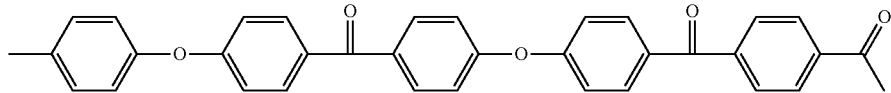
(J'-O)

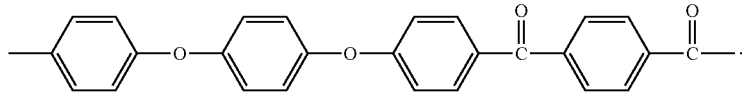
(J'-P)

3. The composition (C) of claim 1, wherein the (PAEK) polymer is present in an amount ranging from 35 to 75 wt. %, based on the total weight of the composition (C).

4. The composition (C) of claim 1, wherein the (PPSU) polymer is present in an amount ranging from 4 to 10 wt. %, based on the total weight of the composition (C).

5. The composition (C) of claim 1, wherein more than 50% moles of the recurring units ($R_{PES}$) are recurring units of formula (D):

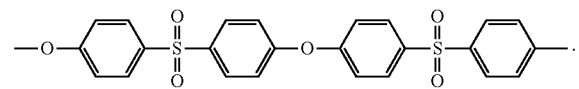
(D)

6. The composition (C) of claim 1, wherein the PES polymer is present in an amount ranging from 25 to 70 wt. %, based on the total weight of the composition (C).

7. The composition (C) of claim 1, wherein the reinforcing filler is a glass fiber and is present in an amount less than or equal to 40 wt. %, based on the total weight of the composition (C).

8. The composition of claim 7, wherein the glass fiber has a circular cross section and an elastic modulus of at least 76 GPa as measured according to ASTM C1557-03.

9. The composition of claim 7, wherein the glass fiber has a non-circular cross section and an elastic modulus of at least 76 GPa as measured according to ASTM C1557-03.

10. The composition of claim 1, wherein the (PAEK) polymer is polyetheretherketone (PEEK).

11. The composition of claim 1, wherein the PES polymer has a melt flow rate (MFR) at a temperature of 380° C. and under a load of 2.16 kg according to ASTM D1238 of greater than or equal to 55 g/10 min.

12. The composition of claim 1, wherein said composition (C) exhibits at least one of:
   a) a tensile breaking strength measured according to ASTM D638 of greater than or equal to about 30,000 psi;
   b) a tensile elongation at break measured according to ASTM D638 of greater than or equal to about 2.6%;
   c) a notched Izod impact resistance measured according to ASTM D256 of greater than or equal to about 1.9 ft-lb/in; and
   d) a no notch Izod impact resistance measured according to ASTM D4812 of greater than or equal to about 21 ft-lb/in.

13. A process for making the polymer composition (C) of claim 1, the process comprising mixing:
   a. the at least one (PAEK) polymer,
   b. the at least one (PPSU) polymer,
   c. the at least one PES polymer, and
   d. the at least one reinforcing filler.

14. The process of claim 13, wherein said mixing includes mixing at least one other ingredient (I).

15. An article comprising the polymer composition (C) of claim 1.

16. The composition of claim 1, wherein the PES polymer has a melt flow rate (MFR) at a temperature of 380° C. and under a load of 2.16 kg according to ASTM D1238 ranging from about 65 g/10 min to about 85 g/10 min.

* * * * *